(12) United States Patent
Sebe et al.

(10) Patent No.: US 8,805,023 B2
(45) Date of Patent: Aug. 12, 2014

(54) OBJECT MOTION ESTIMATING DEVICE, OBJECT MOTION ESTIMATING METHOD, PROGRAM, AND RECORDING MEDIUM

(75) Inventors: Noboru Sebe, Fukuoka (JP); Eitaku Nobuyama, Fukuoka (JP); Shuichi Enokida, Fukuoka (JP)

(73) Assignee: Kyushu Institute of Technology, Fukuoka (JP)

( * ) Notice: Subject to any disclaimer, the term of this patent is extended or adjusted under 35 U.S.C. 154(b) by 259 days.

(21) Appl. No.: 13/202,751

(22) PCT Filed: Jan. 25, 2010

(86) PCT No.: PCT/JP2010/050924
§ 371 (c)(1),
(2), (4) Date: Aug. 22, 2011

(87) PCT Pub. No.: WO2010/098160
PCT Pub. Date: Sep. 2, 2010

(65) Prior Publication Data
US 2011/0299739 A1 Dec. 8, 2011

(30) Foreign Application Priority Data
Feb. 24, 2009 (JP) ................................ 2009-041360

(51) Int. Cl.
*G06K 9/00* (2006.01)
(52) U.S. Cl.
USPC ...................................................... 382/107
(58) Field of Classification Search
None
See application file for complete search history.

(56) References Cited

U.S. PATENT DOCUMENTS

| 5,991,459 A * | 11/1999 | Fogel | 382/264 |
|---|---|---|---|
| 7,558,402 B2 * | 7/2009 | Zhou et al. | 382/103 |
| 2002/0181598 A1 * | 12/2002 | Vetro et al. | 375/240.27 |
| 2008/0046181 A1 * | 2/2008 | Koike et al. | 701/301 |
| 2009/0185078 A1 * | 7/2009 | Van Beek et al. | 348/624 |
| 2010/0142804 A1 * | 6/2010 | Mallick et al. | 382/162 |
| 2013/0259317 A1 * | 10/2013 | Gaddy | 382/107 |

FOREIGN PATENT DOCUMENTS

| JP | 2000-242797 | 9/2000 |
|---|---|---|
| JP | 2008-203538 | 9/2008 |

OTHER PUBLICATIONS

Julier, Simon et al. "Unscented Filtering and Nonlinear Estimation", Proceedings of the IEEE, vol. 92, No. 3, pp. 401-422, Mar. 2004.*
International Search Report Dated Mar. 30, 2010.

* cited by examiner

*Primary Examiner* — Samir Ahmed
(74) *Attorney, Agent, or Firm* — Rankin, Hill & Clark LLP

(57) ABSTRACT

An embodiment of the present invention provides an object motion estimating device and the like, which solve a problem of assuming translational movement (that is, a spatial gradient is 0) of an optical flow and are suitable to estimation of an optical flow by an image analysis of captured images. The object motion estimating device performs the image analysis of the captured images of the object to estimate motion of the object. The object motion estimating device includes an image analyzing unit 15. The image analyzing unit 15 assumes time invariance of the optical flow while not assuming the translational movement, and the image analyzing unit 15 estimates the optical flow with intensity at each point of the captured images as measurement variable while simultaneously estimating a spatial gradient of the optical flow. The assumption about the translational movement of the optical flow is an assumption about the optical flow that is actually unknown. The proposed object motion estimating device can relax this assumption of the translational movement of the optical flow as much as possible.

2 Claims, 4 Drawing Sheets
(2 of 4 Drawing Sheet(s) Filed in Color)

(a)

(b)

OBJECT MOTION ESTIMATING DEVICE, OBJECT MOTION ESTIMATING METHOD, PROGRAM, AND RECORDING MEDIUM

TECHNICAL FIELD

The present invention relates to an object motion estimating device, an object motion estimating method, a program, and a recording medium, particularly to an object motion estimating device and the like that perform image analysis of captured images to estimate motion of an object.

BACKGROUND

An optical flow is an apparent velocity distribution on an image, which is generated by relative motion between an observer and an object. Usually the optical flow is expressed as an apparent velocity vector at each point on the image.

In a conventional gradient method, it is assumed that image intensity of the object is conserved after movement in time-varying image processing, and the optical flow is estimated based on a partial differential equation of an equation (1) called an optical flow equation that expresses a conservation law of the image intensity of the object (see Non Patent Document 1). Where I(x,y,t) is the intensity, (x,y) is a coordinate on the image, t is a time, and $[u\ v]^T$ is the optical flow.

Only the equation (1) is not enough for an equation that determines two variables u and v, the equation lacking a constraint condition. Therefore, assuming that all the optical flows are equal to one another in a neighborhood of a particular point, a linear equation of an equation (2) for the optical flow is obtained (see Non Patent Document 5). Where a suffix expresses partial differential like $I_{tx}=(\partial^2/\partial t \partial x)I$. The linear equation gives a fundamental estimation principal of the optical flow. At this point, a Hessian matrix (3) of the intensity is a quantity that is closely related to a corner of the object in the image, and the quantity det(H) related to numerical solvability of the linear equation is also utilized as a degree of reliability of the estimated optical flow.

[Formula 1]

$$\frac{dI}{dt} = \frac{\partial I}{\partial x}u + \frac{\partial I}{\partial y}v + \frac{\partial I}{\partial t} = 0 \quad (1)$$

$$\begin{bmatrix} I_{tx} \\ I_{ty} \end{bmatrix} = -\begin{bmatrix} I_{xx} & I_{xy} \\ I_{xy} & I_{yy} \end{bmatrix}\begin{bmatrix} u \\ v \end{bmatrix} \quad (2)$$

$$H = \begin{bmatrix} I_{xx} & I_{xy} \\ I_{xy} & I_{yy} \end{bmatrix} \quad (3)$$

PRIOR ART DOCUMENTS

Non Patent Documents

Non Patent Document 1: B. K. P. Horn, and other one person, "Determining optical flow", Artificial Intelligence, 17, 185-203, 1981.

Non Patent Document 2: S. J. Julier, and other one person, "Unscented filtering and nonlinear estimation", Proceedings of IEEE, 92(3), 401-422, 2004

Non Patent Document 3: A. J. Krener, and other one person, "Nonlinear observers with linearizable error dynamics", SIAM Journal of control and optimization, 23 (2), 197-216, 1985

Non Patent Document 4: K. Lucas, and other one person, "An interactive image registration techniques with an application to stereo vision", In Proceedings of 7th IJCAL, pages 674-679, 1981

Non Patent Document 5: A. Verri, and other two persons, "Differential techniques for optical flow" Journal of Optical Society of America A, 7 (5), 912-922, 1990

Non Patent Document 6: Y. Wu, and other two persons, "Unscented Kalman filtering for additive noise case: Augmented versus nonaugmented", IEEE Signal Processing Letters, 12 (5), 357-360, 2005

Non Patent Document 7: Matsunaga, and other two persons, "Study on extraction of optical flow using Kalman filter", The Institute of Electronics, Information and Communication Engineers, Technical Report, Pattern Recognition and Media Understanding (PRMU), 97(501), 15-20, 1998

SUMMARY OF THE INVENTION

Problems to be Solved by the Invention

For example, a study to utilize a spatial extent to reduce an effect of a noise by a spatial difference (Lucas, et al. (see Non Patent Document 4)), and a global method for performing interpolation using the optical flow in a high-reliability portion by requiring a new constraint condition such as smoothness of the optical flow for a region on the image, where nonsingularity of Hessian matrix is lost to degrade the reliability of the estimation of the optical flow (see Non Patent Document 1) can be cited as a directional movement of a study on the optical flow.

Although various improvements have been proposed, a fundamental principle of the gradient method remains unchanged for more than 25 years since the proposal of Horn, et al. (see Non Patent Document 1).

An assumption of a translational movement of the optical flow (that is, spatial gradient is 0) is one of problems of the conventional gradient method. Because the assumption of the translational movement of the optical flow is one about the originally-unknown optical flow, it is necessary to relax the assumption as much as possible.

The invention has been devised to solve the problem described above, and an object thereof is to provide an object motion estimating device and the like that are suitable to the estimation of the optical flow by image analysis of the captured images.

Means for Solving the Problems

A first aspect in accordance with the present invention provides an object motion estimating device that performs image analysis of captured images to estimate motion of an object, the captured images being the images of the object captured by an image capturing unit, the object motion estimating device comprising an image analyzing unit, the image analyzing unit estimating the optical flow with intensity I of pixels of the captured images as a measurement variable while simultaneously estimating a spatial gradient of the estimated optical flow, based on an assumption that a time invariance that a first-order total differential of intensity of the object in the captured images with respect to time is zero holds as for an optical flow that is a velocity distribution of relative motion between the image capturing unit and the object, and not on an assumption that translational movement that the object moves on a plane perpendicular to an image capturing axis of the image capturing unit holds.

The second aspect in accordance with the present invention provides the object motion estimating device of the first aspect, wherein the captured images are two-dimensional images having size of at least 3 pixels by 3 pixels, at least the three captured images whose image capturing times differ from one another are stored in a captured image storage unit, and the image analyzing unit includes an intensity gradient computing unit that computes an intensity gradient at a particular point of the captured images, a temporal gradient computing unit that computes a temporal gradient from the intensity gradient, and an equation computing unit that solves simultaneous equations in which the optical flow and the spatial gradient of the optical flow are set to variables while the temporal gradient is set to a coefficient.

The third aspect in accordance with the present invention provides the object motion estimating device of the first or the second aspect, wherein the image analyzing unit simultaneously estimates the optical flow $[u\ v]^T$ and the spatial gradient of the optical flow $[u\ v]^T$ by solving a linear equation (eq2) with the intensity I at a particular point $P(x_0, y_0)$ on the captured images expressed by an equation (eq1) as a measurement variable $z(t)$.

The fourth aspect in accordance with the present invention provides the object motion estimating device of the first aspect, wherein the image analyzing unit includes a state estimating unit that estimates a state variable including the optical flow and the spatial gradient of the optical flow in an estimation model including a measurement equation for the state variable, and the measurement equation does not include a spatial differentiation by utilizing intensity of a spatial neighborhood of a particular point on the captured images as the measurement variable.

The fifth aspect in accordance with the present invention provides the object motion estimating device of the fourth aspect, wherein a system noise and a measurement noise are considered in the measurement equation, and the estimation of the state variable is performed using a Kalman filter that approximates a covariance of an estimated value.

The sixth aspect in accordance with the present invention provides an object motion estimating method for performing image analysis of captured images of an object to estimate motion of the object, the object motion estimating method comprising a step in which an image capturing unit captures the object at least three times at different image capturing times to store the captured images in a captured image storage unit, and a step in which an image analyzing unit performs the image analysis of the captured images to simultaneously estimate an optical flow and a spatial gradient of the estimated optical flow, using information of the second-order differential of a measurement variable with respect to time, the measurement variable being intensity of pixels of the captured images the optical flow being a velocity distribution of relative motion between the image capturing unit and the object.

The seventh aspect in accordance with the present invention provides a program which makes a computer operate as the object motion estimating device as in any one of the first to fifth aspects.

The eighth aspect in accordance with the present invention provides a computer-readable storage medium having the program of the seventh aspect.

In the third aspect of the present invention, the linear equation (eq2) is an over-constraint linear equation. A solution of the linear equation (eq2) is obtained by an estimation method such as a least-square method.

[Formula 2]

$$z(t) = \begin{bmatrix} I(x_0, y_0, t) \\ I_x(x_0, y_0, t) \\ I_y(x_0, y_0, t) \\ I_{xx}(x_0, y_0, t) \\ I_{xy}(x_0, y_0, t) \\ I_{yy}(x_0, y_0, t) \end{bmatrix} \quad (eq\ 1)$$

$$\begin{bmatrix} I_t \\ I_{tx} \\ I_{ty} \\ I_{txx} \\ I_{txy} \\ I_{tyy} \\ I_{tt} \\ I_{ttx} \\ I_{tty} \\ I_{ttxx} \\ I_{ttxy} \\ I_{ttyy} \end{bmatrix} = - \begin{bmatrix} I_x & I_y & 0 & 0 & 0 & 0 \\ I_{xx} & I_{xy} & I_x & I_y & 0 & 0 \\ I_{xy} & I_{yy} & 0 & 0 & I_x & I_y \\ 0 & 0 & 2I_{xx} & 2I_{xy} & 0 & 0 \\ 0 & 0 & I_{xy} & I_{yy} & I_{xx} & I_{xy} \\ 0 & 0 & 0 & 0 & 2I_{xy} & 2I_{yy} \\ I_{tx} & I_{ty} & 0 & 0 & 0 & 0 \\ I_{txx} & I_{txy} & I_{tx} & I_{ty} & 0 & 0 \\ I_{txy} & I_{tyy} & 0 & 0 & I_{tx} & I_{ty} \\ 0 & 0 & 2I_{txx} & 2I_{txy} & 0 & 0 \\ 0 & 0 & I_{txy} & I_{tyy} & I_{txx} & I_{txy} \\ 0 & 0 & 0 & 0 & 2I_{txy} & 2I_{tyy} \end{bmatrix} \begin{bmatrix} u \\ v \\ u_x \\ v_x \\ u_y \\ v_y \end{bmatrix} \quad (eq\ 2)$$

Effect of Invention

In each aspect of the invention according to the present application (hereinafter, referred to as the present invention), processing is specifically performed by utilizing a physical property related to the image captured as data, and the optical flow can be estimated without requiring the assumption of the translational movement of the optical flow and without always requiring the nonsingularity of Hessian matrix of the image intensity. Conventionally, even in the case that the optical flow is not translational, the optical flow can be estimated when prior information on the motion such as simple expansion and rotation is known (see Non Patent Document 1). However, such conventional methods also require the prior information on the optical flow in addition to the intensity at each point of the captured images. According to the present invention, the optical flow can be estimated without requiring such prior information.

Further, according to the present invention, a spatial gradient of the optical flow can also be estimated simultaneously with the optical flow. The spatial gradient of the optical flow is an important quantity in restoring the object motion in a three-dimensional space because the spatial gradient includes information on rotation or divergence of a vector field. In the present invention, the spatial gradient that is of the important quantity can simultaneously be estimated along with the optical flow without requiring the prior assumption.

As described above, the translational motion (that is, the motion of the object at a constant speed without the rotation on a plane perpendicular to an optical axis of a camera) is assumed in the conventional gradient method. Therefore, accuracy is degraded in principle in measuring the movement including motions along the optical axis or rotations. On the other hand, in the present invention, the spatial gradient can simultaneously be estimated (corrected) to improve the accuracy in principle. Thus, the rotation or the expansion of the image is directly detected, and the effect of the rotation or the expansion of the image on the optical flow is corrected, whereby the accuracy of the optical flow is improved in the case of the motions including the rotation or the expansion.

Another problem of the conventional gradient method is that a nature of an estimation principal becomes difficult to see because of too much focus on a noise reduction technique. For example, there is a method for utilizing a neighborhood in order to compensate shortage of an equation. An assumption that the optical flow is same in a considered range is made in the method. Although the assumption holds in the case that the sufficiently small region is considered, independency of the equation (1) is lost when the region is small. Due to the size of the region, there is a trade-off between realization of the assumption and the independency of the equation. The conventional gradient method is the method based on the assumption of discrete data in time and space and is not suitable to a possibility of intrinsic estimation.

According to the present invention, the optical flow can be estimated from the information only in the neighborhood of the particular point, namely, only the information on the intensity and its spatiotemporal gradient of the particular point.

There is also a problem of implementing in the conventional gradient method. In the conventional gradient method, it is necessary to explicitly calculate a spatiotemporal differential of the intensity information, and difference computing is inevitably performed in order to obtain the intensity information from the image information. The difference computing is susceptible to a disturbance, which has a large effect on reliability of the estimation of the optical flow. Nonsingularity of Hessian matrix and the like are postulated in order to solve a linear simultaneous equation from the pieces of difference information. At this point, unfortunately the estimation is degraded by calculating an inverse matrix.

According to the fourth and fifth aspects of the invention, the estimation can be performed without using the spatiotemporal differential and the explicit calculation of the inverse matrix. The explicit calculation of the inverse matrix can be avoided by a noise countermeasure in which, for example, a Kalman filter is used, thereby improving accuracy of the calculation of the optical flow.

BRIEF DESCRIPTION OF DRAWINGS

The patent or application file contains at least one drawing executed in color. Copies of this patent or patent application publication with color drawing(s) will be provided by the Office upon request and payment of the necessary fee.

DESCRIPTION OF EMBODIMENTS

Figure 1:
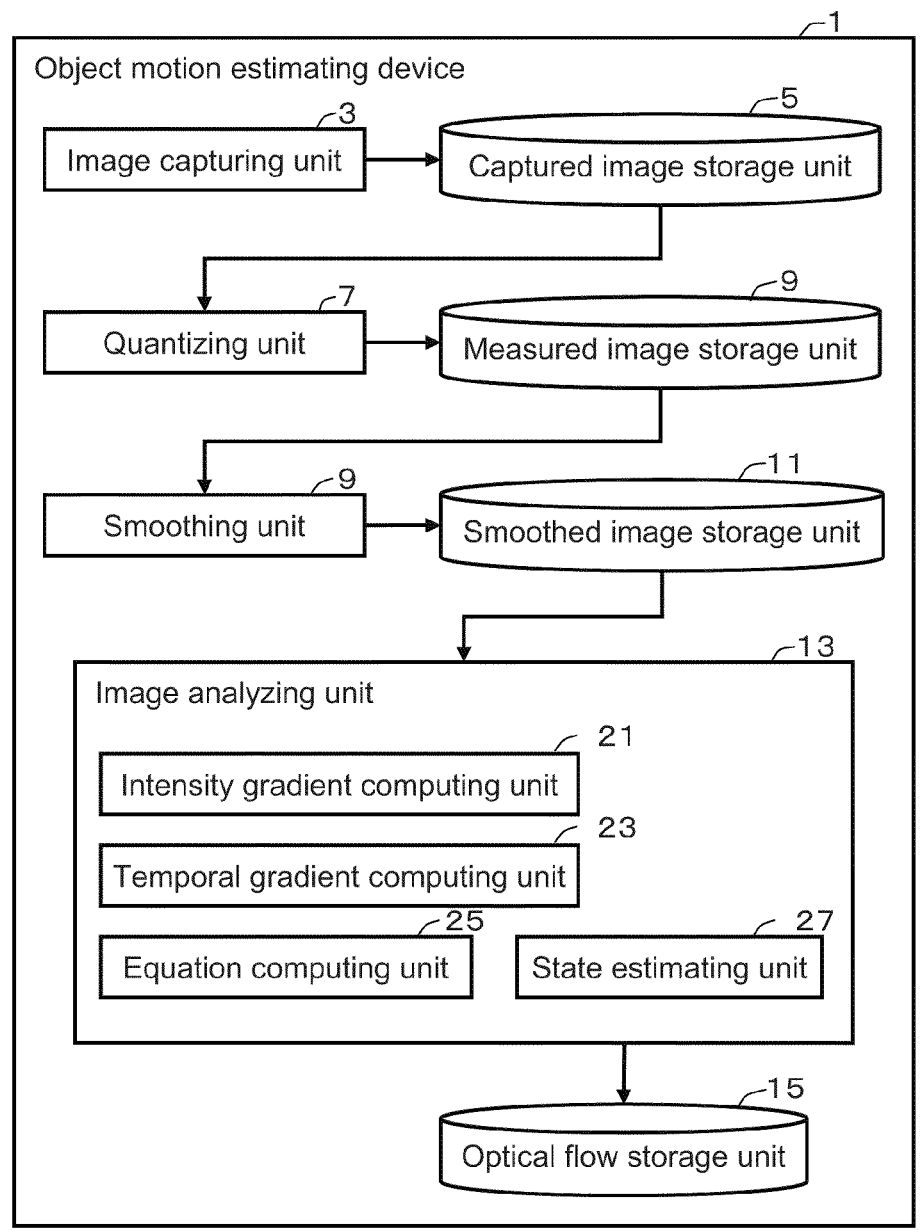
FIG. 1 is a schematic block diagram illustrating an object motion estimating device 1 according to an embodiment of the present invention.

Hereinafter, embodiments of the present invention will be described with reference to the drawings. However, the invention is not limited to the embodiments.
[First Embodiment]
FIG. 1 is a schematic block diagram illustrating an object motion estimating device 1 according to an embodiment of the present invention. For example, the object motion estimating device 1 is a drive recorder.

The object motion estimating device 1 includes an image capturing unit 3 that captures images, a captured image storage unit 5 in which the images captured by the image capturing unit 3 are stored, a quantizing unit 7 that quantizes time and/or intensity for each point on the captured images to produce measured images, a measured image storage unit 9 in which the measured images are stored, a smoothing unit 11 that smoothes the measured images to produce smoothed images, a smoothed image storage unit 13 in which the smoothed images are stored, an image analyzing unit 15 that estimates the optical flow based on the quantized images, and an optical flow storage unit 17 in which the estimated optical flow is stored.

For example, the image capturing unit 3 is a car-mounted camera. Because the car-mounted camera is basically oriented toward a travelling direction, motion along an optical axis is inevitable. Besides, expansion caused by distortion of the image is also inevitable in a wide-angle image such as the drive recorder. Therefore, the captured images include a large error.

For example, the quantizing unit 7 quantizes a point (x,y) of the captured images in which x and y are integers at an integral time t by rounding down decimal places, thereby producing the measured image. A quantizing error is added by the processing performed by the quantizing unit 7.

For example, the smoothing unit 11 performs the smoothing at each time of the measured images using a Gaussian filter, thereby obtaining the smoothed images.

The image analyzing unit 13 estimates the optical flow with the intensity information on the smoothed images. The image analyzing unit 13 includes an intensity gradient computing unit 21, a temporal gradient computing unit 23, an equation computing unit 25, and a state estimating unit 27. The intensity gradient computing unit 21 computes an intensity gradient at a particular point of the captured images. The temporal gradient computing unit 23 computes a temporal gradient from the intensity gradient. The equation computing unit 25 solves a simultaneous equation in which the temporal gradient is set as a coefficient while the optical flow and a spatial gradient of the optical flow are set as variables. The state estimating unit 27 sets information on intensity of a spatial neighborhood of the particular point on the captured images as a measurement variable and sequentially estimates the optical flow and the spatial gradient of the optical flow using a filter. A specific operation of the image analyzing unit 13 will mainly be described below.

Generalization of an optical flow equation will be described. At this point, it is assumed that I(x,y,t) is intensity in a position (x,y) on the image at a time t, and it is assumed that I(x,y,t) can be differentiated as many as necessary times. The optical flow is expressed by $[u(x,y,t)\ v(x,y,t)]^T$, and it is also assumed that $[u(x,y,t)\ v(x,y,t)]^T$ can be differentiated as many as necessary times. In the embodiment, a partial differential is expressed by a suffix like $I_t$ ($=\partial I/\partial t$).

In the constraint equation of intensity constancy (1), it can also be interpreted that a gradient in a direction of $[u\ v\ 1]^T$ in the time and space of the intensity I(x,y,t) is zero like an equation (4).

It is assumed that the equation (4) holds at a certain point $P(x_0,y_0,t_0)$ in the time and space. A condition that the intensity does not change at a neighborhood point $(x_0+\Delta x, y_0+\Delta y, t_0+\Delta t)$ of the point P after the movement along the optical flow is expressed as a condition that a directional differentiation is 0 at the neighborhood point. An equation (5) is a condition that the intensity, the optical flow, and a spatial differentiation of the optical flow at the neighborhood point are approximated by using infinitesimal amounts Δx, Δy, and Δt. When the second order terms of the infinitesimal amounts Δx, Δy, and Δt are omitted, it is necessary that coefficients of the first order terms of the infinitesimal amounts Δx, Δy, and Δt be 0 in order that the equation (5) holds in any neighborhood. Therefore, the condition of the intensity constancy after the movement along the optical flow at each point in the neighborhood means that the three equations (6a) to (6c) hold.

Generalized optical flow identities (6) are conditions, in which Taylor expansion of the conditional expression of the intensity constancy in the neighborhood of the particular point on the images is performed until only the zero and first order terms. Then, it is found that the conventional constraint equation of intensity constancy (4) is corresponding to the zero order terms of the Taylor expansion. The condition of the equation (6) can also be derived by partially differentiating the conventional optical flow equation (4) with respect to x, y, and t, and the intensity constancy condition corresponding to the higher order terms of the Taylor expansion can easily be derived as well. Equations (7a) to (7f) are conditions corresponding to the second order terms used in the present embodiment.

[Formula 3]

$$\begin{bmatrix} u \\ v \\ 1 \end{bmatrix}^T \begin{bmatrix} I_x \\ I_y \\ I_t \end{bmatrix} = 0 \quad (4)$$

$$\begin{bmatrix} u + u_x\Delta x + u_y\Delta y + u_t\Delta t \\ v + v_x\Delta x + v_y\Delta y + v_t\Delta t \\ 1 \end{bmatrix}^T \begin{bmatrix} I_x + I_{xx}\Delta x + I_{xy}\Delta y + I_{xt}\Delta t \\ I_y + I_{xy}\Delta x + I_{yy}\Delta y + I_{yt}\Delta t \\ I_t + I_{tx}\Delta x + I_{ty}\Delta y + I_{tt}\Delta t \end{bmatrix} = 0 \quad (5)$$

$$\begin{bmatrix} u_x \\ v_x \\ 0 \end{bmatrix}^T \begin{bmatrix} I_x \\ I_y \\ I_t \end{bmatrix} + \begin{bmatrix} u \\ v \\ 1 \end{bmatrix}^T \begin{bmatrix} I_{xx} \\ I_{xy} \\ I_{tx} \end{bmatrix} = 0 \quad (6a)$$

$$\begin{bmatrix} u_y \\ v_y \\ 0 \end{bmatrix}^T \begin{bmatrix} I_x \\ I_y \\ I_t \end{bmatrix} + \begin{bmatrix} u \\ v \\ 1 \end{bmatrix}^T \begin{bmatrix} I_{xy} \\ I_{yy} \\ I_{ty} \end{bmatrix} = 0 \quad (6b)$$

$$\begin{bmatrix} u_t \\ v_t \\ 0 \end{bmatrix}^T \begin{bmatrix} I_x \\ I_y \\ I_t \end{bmatrix} + \begin{bmatrix} u \\ v \\ 1 \end{bmatrix}^T \begin{bmatrix} I_{tx} \\ I_{ty} \\ I_{tt} \end{bmatrix} = 0 \quad (6c)$$

$$\begin{bmatrix} u_{xx} \\ v_{xx} \\ 0 \end{bmatrix}^T \begin{bmatrix} I_x \\ I_y \\ I_t \end{bmatrix} + 2\begin{bmatrix} u_x \\ v_x \\ 0 \end{bmatrix}^T \begin{bmatrix} I_{xx} \\ I_{xy} \\ I_{tx} \end{bmatrix} + \begin{bmatrix} u \\ v \\ 1 \end{bmatrix}^T \begin{bmatrix} I_{xxx} \\ I_{xxy} \\ I_{txx} \end{bmatrix} = 0 \quad (7a)$$

$$\begin{bmatrix} u_{xy} \\ v_{xy} \\ 0 \end{bmatrix}^T \begin{bmatrix} I_x \\ I_y \\ I_t \end{bmatrix} + \begin{bmatrix} u_x \\ v_x \\ 0 \end{bmatrix}^T \begin{bmatrix} I_{xy} \\ I_{yy} \\ I_{ty} \end{bmatrix} + \begin{bmatrix} u_y \\ v_y \\ 0 \end{bmatrix}^T \begin{bmatrix} I_{xx} \\ I_{xy} \\ I_{tx} \end{bmatrix} + \begin{bmatrix} u \\ v \\ 1 \end{bmatrix}^T \begin{bmatrix} I_{xxy} \\ I_{xyy} \\ I_{txy} \end{bmatrix} = 0 \quad (7b)$$

$$\begin{bmatrix} u_{yy} \\ v_{yy} \\ 0 \end{bmatrix}^T \begin{bmatrix} I_x \\ I_y \\ I_t \end{bmatrix} + 2\begin{bmatrix} u_y \\ v_y \\ 0 \end{bmatrix}^T \begin{bmatrix} I_{xy} \\ I_{yy} \\ I_{ty} \end{bmatrix} + \begin{bmatrix} u \\ v \\ 1 \end{bmatrix}^T \begin{bmatrix} I_{xyy} \\ I_{yyy} \\ I_{tyy} \end{bmatrix} = 0 \quad (7c)$$

$$\begin{bmatrix} u_{tx} \\ v_{tx} \\ 0 \end{bmatrix}^T \begin{bmatrix} I_x \\ I_y \\ I_t \end{bmatrix} + \begin{bmatrix} u_x \\ v_x \\ 0 \end{bmatrix}^T \begin{bmatrix} I_{ty} \\ I_{ty} \\ I_{tt} \end{bmatrix} + \begin{bmatrix} u_t \\ v_t \\ 0 \end{bmatrix}^T \begin{bmatrix} I_{xx} \\ I_{xy} \\ I_{tx} \end{bmatrix} + \begin{bmatrix} u \\ v \\ 1 \end{bmatrix}^T \begin{bmatrix} I_{txx} \\ I_{txy} \\ I_{ttx} \end{bmatrix} = 0 \quad (7d)$$

$$\begin{bmatrix} u_{ty} \\ v_{ty} \\ 0 \end{bmatrix}^T \begin{bmatrix} I_x \\ I_y \\ I_t \end{bmatrix} + \begin{bmatrix} u_y \\ v_y \\ 0 \end{bmatrix}^T \begin{bmatrix} I_{ty} \\ I_{ty} \\ I_{tt} \end{bmatrix} + \begin{bmatrix} u_t \\ v_t \\ 0 \end{bmatrix}^T \begin{bmatrix} I_{xy} \\ I_{yy} \\ I_{ty} \end{bmatrix} + \begin{bmatrix} u \\ v \\ 1 \end{bmatrix}^T \begin{bmatrix} I_{txy} \\ I_{tyy} \\ I_{tty} \end{bmatrix} = 0 \quad (7e)$$

$$\begin{bmatrix} u_{tt} \\ v_{tt} \\ 0 \end{bmatrix}^T \begin{bmatrix} I_x \\ I_y \\ I_t \end{bmatrix} + 2\begin{bmatrix} u_t \\ v_t \\ 0 \end{bmatrix}^T \begin{bmatrix} I_{tx} \\ I_{ty} \\ I_{tt} \end{bmatrix} + \begin{bmatrix} u \\ v \\ 1 \end{bmatrix}^T \begin{bmatrix} I_{ttx} \\ I_{tty} \\ I_{ttt} \end{bmatrix} = 0 \quad (7f)$$

An estimation model of the optical flow will be described below. In this embodiment, a constraint condition of the optical flow equation is described as a first-order non-linear simultaneous differential equation and dealt with as a dynamical system. The estimation principal and the possibility condition for estimation which are used to simultaneously estimate the optical flow and the spatial gradient of the optical flow will be shown using a concept of observability of a state of the dynamical system.

In the case that the constraint condition of the optical flow equation is dealt with as the dynamical system, the constraint equation should not be selected based on the order of the Taylor expansion. Rather, the constraint equation that describes the system should be selected based on the order of the spatial gradient used in the estimation and the spatiotemporal gradient of the optical flow to be estimated. Therefore, the optical flow of an equation (9) and a spatial gradient m of the optical flow are estimated using the zero, first and second order spatial gradient i of the intensity of the equation (8).

It is assumed that the spatial gradient of the third order or more of the intensity, which is not used in the estimation, and the spatial gradient of the second order or more, which are not estimated, are 0. It is also assumed that the optical flow is time invariant. That is, $u_t=0$ and $v_t=0$. This assumption means that the spatial gradient of the optical flow is also time invariant.

A state q(t) is selected as an equation (10) using the intensity, the optical flow, and the spatial gradient of the optical flow at a certain point $P(x_0, y_0)$ on the images based on the assumptions. The equations (4), (6a), (6b), (7a), (7b), and (7c) are selected as the constraint equations that describe temporal differentiations of these variables, whereby the estimation model of the optical flow is obtained as equations (11a) to (11d). Where $E_{m \times n}$ and $O_{m \times n}$ are an m×n identity matrix and an m×n zero matrix, respectively. Arguments $x_0$, $y_0$, and t of the function will be omitted as appropriate.

[Formula 4]

$$i = \begin{bmatrix} I & I_x & I_y & I_{xx} & I_{xy} & I_{yy} \end{bmatrix}^T \quad (8)$$

$$m = \begin{bmatrix} u & v & u_x & v_x & u_y & v_y \end{bmatrix}^T \quad (9)$$

$$q(t) = \begin{bmatrix} i(x_0, y_0, t) \\ m(x_0, y_0, t) \end{bmatrix} \quad (10)$$

$$\frac{d}{dt}q(t) = f(q(t)) \quad (11a)$$

$$z(t) = h(q(t)) \quad (11b)$$

-continued $$f(q) = -\begin{bmatrix} I_x u + I_y v \\ I_{xx} u + I_{xy} v + I_x u_x + I_y v_x \\ I_{xy} u + I_{yy} v + I_x u_y + I_y v_y \\ 2I_{xx} u_x + 2I_{xy} v_x \\ I_{xx} u_y + I_{xy}(v_y + u_x) + I_{yy} v_x \\ 2I_{xy} u_y + 2I_{yy} v_y \\ O_{6 \times 1} \end{bmatrix}$$ (11c)

$$h(q) = [E_{6 \times 6} \; O_{6 \times 6}] q$$ (11d)

The observability of the system means a property of the system, in which the state can uniquely be determined by observation of an output in a finite time interval. Specifically, the dynamical system expressed by a non-linear differential equation of an equation (12) is considered. Where state $q(t) \in R^n$ and output $z(t) \in R^m$. At this point, the observability is defined by referring to Non Patent Document 3, and Lemma 1 holds.

Definition: It is assumed that a system (12) is given. The system (12) is observable at the state $q_0$ if an initial state $q_0 = q(t_0)$ can uniquely be determined from a measurement output $z(t)$ ($t_0 \le t \le t_1$) and the knowledge that the initial state exist in the neighborhood of $q_0$ for an arbitrary initial time $t_0$, the initial state $q_0$ and a finite time $t_1$.

Lemma 1: the following propositions (i), (ii), and (iii) are equivalent.
(i) The given system (12) is observable at the state $q_0$.
(ii) An equation (13) holds in $q(t) = q_0$ (in the sense of real vector).
(iii) An equation (14) holds in $q(t) = q_0$.

Where a Lie differentiation is given by an equation (15) and a differential form of the Lie differentiation is given by an equation (16). The specific state q can be determined by solving a non-linear simultaneous algebraic equation of an equation (17) for q.

[Formula 5]

$$\frac{d}{dt} q(t) = f(q(t))$$ (12a)

$$z(t) = h(q(t))$$ (12b)

$$\text{span}\{dh, dL_f h, \ldots, dL_f^{n-1} h\} = n$$ (13)

$$\text{rank} \begin{bmatrix} dh \\ dL_f h \\ \vdots \\ dL_f^{n-1} h \end{bmatrix} = n$$ (14)

$$L_f^0 h(q) = h(q), \; L_f^k h(q) = \frac{\partial L_f^{k-1} h}{\partial q} f(q) \; (k \ge 1)$$ (15)

$$dL_f^k h(q) = \frac{\partial L_f^k h}{\partial q} \; (k \ge 0)$$ (16)

$$\begin{bmatrix} z \\ \frac{d}{dt} z \\ \vdots \\ \frac{d^{k-1}}{dt^{k-1}} z \end{bmatrix} = \begin{bmatrix} h(q) \\ L_f h(q) \\ \vdots \\ L_f^{k-1} h(q) \end{bmatrix}$$ (17)

In the case of the estimation model defined by the equation (11), the state q(t) of the equation (10) can uniquely be determined from the output z(t). At this point, because the state q(t) includes the optical flow $[u \; v]^T$, the optical flow can uniquely be determined when the estimation model is observable. The observability of the non-linear dynamical system of the estimation model (11) of the optical flow can be checked by using the Lie differentiation. From the equation (11d), a differential form dh of the Lie differentiation is expressed by an equation (18). Because the differential form dh has the above-described structure, full column rank properties of seventh to twelfth columns of a differential form $dL_f^k h$ (k=1, ..., 11) should be checked for the observability. Hereinafter a partial matrix corresponding to the seventh to twelfth columns of a matrix A is expressed by $(A)_2$.

When the equation (16) is calculated for the system of the equation (11), an equation (19) is obtained. Here, N, J, and $J_t$ are equations (20), (21), and (22), respectively. When a rank of the differential form is actually calculated using the equation (19), equations (23) and (24) are obtained. And the system becomes observable at the general state q(t), which allows the optical flow and the spatial gradient m of the optical flow to be simultaneously estimated.

However, because the observability is not always guaranteed in a particular state (for example, $q(t) = O_{12 \times 1}$), a condition that the intensity and the optical flow should satisfy in order that the observability holds will be discussed below. Because the first matrix on the right side of the equation (19) is always the regular matrix, an equation (25) is satisfied if $[J^T \; J_t^T]^T$ becomes full column rank. Therefore, it is necessary to show the condition that the state q(t) makes $[J^T \; J_t^T]^T$ full column rank.

Theorem 1: The sufficient condition for the satisfaction of the equation (24) and the system of the equation (11) being observable is satisfied when one of the following two conditions (i) and (ii) holds.
(i) The Hessian matrix H of the intensity satisfies an equation (26) and satisfies any of conditional collaterals of equations (27a), (27b), and (27c) (where α is an arbitrary constant).
(ii) A first-order spatial gradient of the intensity and a temporal differentiation of the spatial gradient satisfy an equation (28).

In some cases, the optical flow $[u \; v]^T$ can be estimated even if the three conditional collaterals in (i) of Theorem 1 are not satisfied.

The condition of the equation (26) in (i) of theorem 1 is one in which the possibility of estimation is determined only from the image intensity, and the condition of the equation (26) is equivalent to the previously-known nonsingularity of Hessian matrix of the intensity. On the other hand, the possibility of estimation is determined by a temporal change of the image intensity gradient under the condition of the equation (28) in (ii) of theorem 1, and the condition of the equation (28) is an unknown, new condition. The possibility condition for estimation is relaxed compared with the conventional method by adding the condition (28) as the sufficient condition, and states, namely, a combination of the intensity and the optical flow which can be estimated are increased.

One of the features of the condition of the equation (28) is that sometimes the system is estimable even if the Hessian matrix H of the intensity is the zero matrix. That is, an equation (29) is one in which the matrix of the equation (28) is specifically written. In the matrix of the equation (29), even if the Hessian matrix H is the zero matrix, generally a rank becomes 2 except the case of an equation (30), and the optical flow can be estimated. Because the equation (30) expresses the optical flow (particularly, α=0 in the translation) in the case of the simple expansion and contraction, the optical flow can also be estimated by the condition of the equation (28) in the case except the simple expansion and contraction. Actually, as demonstrated later by a numerical experiment, in the image in which the Hessian matrix H is the zero matrix in the whole image, the optical flow can be estimated using the estimation model when the image is rotated about a certain point at a constant angular velocity. This fact shows the robustness of the estimation model that is largely different from the conventional estimation method (see Non Patent Document 5) in which the optical flow cannot be estimated in the case det(H)=0 even if H≠0.

[Formula 6]

$$dh = [E_{6\times 6} \; O_{6\times 6}] \tag{18}$$

$$\begin{bmatrix} (dL_f h)_2 \\ (dL_f^2 h)_2 \end{bmatrix} = \begin{bmatrix} E_{6\times 6} & O_{6\times 6} \\ N & E_{6\times 6} \end{bmatrix} \begin{bmatrix} J \\ J_t \end{bmatrix} \tag{19}$$

$$N = -\begin{bmatrix} 0 & u & v & 0 & 0 & 0 \\ 0 & u_x & v_x & u & v & 0 \\ 0 & u_y & v_y & 0 & u & v \\ 0 & 0 & 0 & 2u_x & 2v_x & 0 \\ 0 & 0 & 0 & u_y & v_y+u_x & v_x \\ 0 & 0 & 0 & 0 & 2u_y & 2v_y \end{bmatrix} \tag{20}$$

[Formula 7]

$$J = -\begin{bmatrix} I_x & I_y & 0 & 0 & 0 & 0 \\ I_{xx} & I_{xy} & I_x & I_y & 0 & 0 \\ I_{xy} & I_{yy} & 0 & 0 & I_x & I_y \\ 0 & 0 & 2I_{xx} & 2I_{xy} & 0 & 0 \\ 0 & 0 & I_{xy} & I_{yy} & I_{xx} & I_{xy} \\ 0 & 0 & 0 & 0 & 2I_{xy} & 2I_{yy} \end{bmatrix} \tag{21}$$

$$J_t = -\begin{bmatrix} I_{tx} & I_{ty} & 0 & 0 & 0 & 0 \\ I_{txx} & I_{txy} & I_{tx} & I_{ty} & 0 & 0 \\ I_{txy} & I_{tyy} & 0 & 0 & I_{tx} & I_{ty} \\ 0 & 0 & 2I_{txx} & 2I_{txy} & 0 & 0 \\ 0 & 0 & I_{txy} & I_{tyy} & I_{txx} & I_{txy} \\ 0 & 0 & 0 & 0 & 2I_{txy} & 2I_{tyy} \end{bmatrix} \tag{22}$$

$$\mathrm{rank}(dL_f h)_2 = 5 \tag{23}$$

$$\mathrm{rank}\begin{bmatrix} (dL_f h)_2 \\ (dL_f^2 h)_2 \end{bmatrix} = 6 \tag{24}$$

$$\mathrm{rank}\begin{bmatrix} (dL_f h)_2 \\ (dL_f^2 h)_2 \end{bmatrix} = \mathrm{rank}\begin{bmatrix} J \\ J_t \end{bmatrix} \tag{25}$$

$$\mathrm{rank}\begin{bmatrix} I_{xx} & I_{xy} \\ I_{xy} & I_{yy} \end{bmatrix} = 2 \tag{26}$$

$$\begin{bmatrix} u \\ v \end{bmatrix} \neq O_{2\times 1} \tag{27a}$$

$$\begin{bmatrix} u_x & u_y \\ v_x & v_y \end{bmatrix} \neq \alpha E_{2\times 2} \tag{27b}$$

$$\begin{bmatrix} u_x & u_y \\ v_x & v_y \end{bmatrix} \neq O_{2\times 2}, \; \text{and} \; \begin{bmatrix} I_x \\ I_y \end{bmatrix} \neq O_{2\times 1} \tag{27c}$$

$$\mathrm{rank}\begin{bmatrix} I_x & I_y \\ I_{tx} & I_{ty} \end{bmatrix} = 2 \tag{28}$$

$$\begin{bmatrix} I_x & I_y \\ -(I_{xx}u + I_{xy}v + I_x u_x + I_y v_x) & -(I_{xy}u + I_{yy}v + I_x u_y + I_y v_y) \end{bmatrix} \tag{29}$$

$$\begin{bmatrix} u_x & u_y \\ v_x & v_y \end{bmatrix} = \alpha E_{2\times 2} \tag{30}$$

A specific calculating equation that obtains the optical flow and the spatial gradient of the optical flow from the spatiotemporal gradient of the intensity will be described below. Because the differentiation is performed twice in order that the differential form becomes the full column rank, information of the zero, first and second-order differentiation with respect to time of a measurement variable z(t) is required in order to perform the instantaneous estimation. An equation (31) is obtained by specifically writing the equation (17) for (d/dt)z(t) and (d²/dt²)z(t) except the trivially determinable z(t). The equation (31) corresponds to (eq2) of claims. All elements of the matrices J and $J_t$ defined by the equations (21) and (22) are the spatiotemporal gradient of the intensity and can be obtained from the measurement variable z(t). Accordingly, the equation (31) is a linear equation with respect to the variable to be estimated. Not only the optical flow but also the spatial gradient of the optical flow can instantaneously be estimated by solving the over-constraint linear equation using, for example, a least-square method.

As for the image data necessary for the implementation, because it is necessary to calculate the second-order spatial gradient of the intensity, at least 3 pixels×at least 3 pixels is required in each time. In addition, because the zero, first and second-order differentiation with respect to the time of the spatial gradient of the intensity is also required, at least three images are required in a time-series direction. That is, an image size necessary to estimate the optical flow and the spatial gradient of the optical flow according to the equation (25) is at least 3 pixels (x-direction)×3 pixels (y-direction)×3 (t-direction).

An example of the actual calculation technique will be described with reference to FIG. 2. Assuming that I(x,y,t) is the intensity at the time t in the coordinate (x,y), the optical flow $[u \; v]^T$ and the spatial gradient of the optical flow will be obtained at the time $t_0$ in the particular point $(x_0, y_0)$.

The image capturing unit 3 captures at least 3 images of at least 3 pixels×at least 3 pixels at different times as the captured images (Step ST1). The quantizing unit 7 quantizes the time and/or intensity for each point on the captured images to produce the measured images (Step ST2). The smoothing unit 11 smoothes the measured images to produce the smoothed images (Step ST3). For the sake of specific description, it is assumed that the 27-pixel intensity in which $x=x_0-1$, $x_0$, or $x_0+1$, $y=y_0-1$, $y_0$, or $y_0+1$, and $t=t_0-2$, $t_0-1$, or $t_0$ are combined in I(x,y,t) is used as the data.

The intensity gradient computing unit 21 obtains the intensity gradient (Step ST4). The data obtained by the calculation is expressed by G to be distinguished from the observation data, because the obtained calculated data, including intensity, is modified in accordance with the most probable data. The data G is expressed by an equation (32). Where $t=t_0-2$, $t_0-1$, and $t_0$ with respect to the equations (32a), (32b), (32c), (32d), (32e), and (32f).

The temporal gradient computing unit 23 obtains the temporal gradient from this data (Step ST5). The temporal gradient is expressed by an equation (33). Where $t=t_0-1$ and $t_0$ with respect to the equations (33a), (33b), (33c), (33g), (33h), and (33i). The equation computing unit 25 obtains the optical flow and the spatial gradient of the optical flow by solving a simultaneous equation of an equation (34) (Step ST6). The image analyzing unit 13 stores the optical flow and the spatial gradient of the optical flow in the optical flow storage unit 15 (Step ST7).

[Formula 8]

$$\begin{bmatrix} \frac{d}{dt}z(t) \\ \frac{d^2}{dt^2}z(t) \end{bmatrix} = \begin{bmatrix} J \\ J_t \end{bmatrix} m \quad (31)$$

$$G(x_0, y_0, t) = (-I(x_0-1, y_0-1, t) \times 1 + I(x_0-1, y_0, t) \times 2 - \quad (32a)$$
$$I(x_0-1, y_0+1, t) \times 1 + I(x_0, y_0-1, t) \times 2 + I(x_0, y_0, t) \times 5 +$$
$$I(x_0, y_0+1, t) \times 2 - I(x_0+1, y_0-1, t) \times 1 +$$
$$I(x_0+1, y_0, t) \times 2 - I(x_0+1, y_0+1, t) \times 1)/9$$

$$G_x(x_0, y_0, t) = \quad (32b)$$
$$(-I(x_0-1, y_0-1, t) - I(x_0-1, y_0, t) - I(x_0-1, y_0+1, t) +$$
$$I(x_0+1, y_0-1, t) + I(x_0+1, y_0, t) + I(x_0+1, y_0+1, t))/6$$

$$G_y(x_0, y_0, t) = \quad (32c)$$
$$(-I(x_0-1, y_0-1, t) - I(x_0, y_0-1, t) - I(x_0+1, y_0-1, t) +$$
$$I(x_0-1, y_0+1, t) + I(x_0, y_0+1, t) + I(x_0+1, y_0+1, t))/6$$

$$G_{xx}(x_0, y_0, t) = \quad (32d)$$
$$(+I(x_0-1, y_0-1, t) + I(x_0-1, y_0, t) + I(x_0-1, y_0+1, t) +$$
$$(I(x_0, y_0-1, t) + I(x_0, y_0, t) + I(x_0, y_0+1, t)) \times (-2) +$$
$$I(x_0+1, y_0-1, t) + I(x_0+1, y_0, t) + I(x_0+1, y_0+1, t))/3$$

$$G_{yy}(x_0, y_0, t) = \quad (32e)$$
$$(+I(x_0-1, y_0-1, t) + I(x_0, y_0-1, t) + I(x_0+1, y_0-1, t) +$$
$$(I(x_0-1, y_0, t) + I(x_0, y_0, t) + I(x_0+1, y_0, t)) \times (-2) +$$
$$I(x_0-1, y_0+1, t) + I(x_0, y_0+1, t) + I(x_0+1, y_0+1, t))/3$$

$$G_{xy}(x_0, y_0, t) = (+I(x_0-1, y_0-1, t) - I(x_0-1, y_0+1, t) - \quad (32f)$$
$$I(x_0+1, y_0-1, t) + I(x_0+1, y_0+1, t))/4$$

$$G_t(x_0, y_0, t) = G(x_0, y_0, t) - G(x_0, y_0, t-1) \quad (33a)$$

$$G_{tx}(x_0, y_0, t) = G_x(x_0, y_0, t) - G_x(x_0, y_0, t-1) \quad (33b)$$

$$G_{ty}(x_0, y_0, t) = G_y(x_0, y_0, t) - G_y(x_0, y_0, t-1) \quad (33c)$$

$$G_{tt} = (x_0, y_0, t_0) = G_t(x_0, y_0, t_0) - G_t(x_0, y_0, t_0-1) \quad (33d)$$

$$G_{ttx}(x_0, y_0, t_0) = G_{tx}(x_0, y_0, t_0) - G_{tx}(x_0, y_0, t_0-1) \quad (33e)$$

$$G_{tty}(x_0, y_0, t_0) = G_{ty}(x_0, y_0, t_0) - G_{ty}(x_0, y_0, t_0-1) \quad (33f)$$

$$G_{txx}(x_0, y_0, t) = G_{xx}(x_0, y_0, t) - G_{xx}(x_0, y_0, t-1) \quad (33g)$$

$$G_{txy}(x_0, y_0, t) = G_{xy}(x_0, y_0, t) - G_{xy}(x_0, y_0, t-1) \quad (33h)$$

$$G_{tyy}(x_0, y_0, t) = G_{yy}(x_0, y_0, t) - G_{yy}(x_0, y_0, t-1) \quad (33i)$$

$$G_{ttxx}(x_0, y_0, t_0) = G_{txx}(x_0, y_0, t_0) - G_{txx}(x_0, y_0, t_0-1) \quad (33j)$$

$$G_{ttxy}(x_0, y_0, t_0) = G_{txy}(x_0, y_0, t_0) - G_{txy}(x_0, y_0, t_0-1) \quad (33k)$$

$$G_{ttyy}(x_0, y_0, t_0) = G_{tyy}(x_0, y_0, t_0) - G_{tyy}(x_0, y_0, t_0-1) \quad (33l)$$

[Formula 9]

$$\begin{bmatrix} G_t \\ G_{tx} \\ G_{ty} \\ G_{txx} \\ G_{txy} \\ G_{tyy} \\ G_{tt} \\ G_{ttx} \\ G_{tty} \\ G_{ttxx} \\ G_{ttxy} \\ G_{ttyy} \end{bmatrix} = - \begin{bmatrix} G_x & G_y & 0 & 0 & 0 & 0 \\ G_{xx} & G_{xy} & G_x & G_y & 0 & 0 \\ G_{xy} & G_{yy} & 0 & 0 & G_x & G_y \\ 0 & 0 & 2G_{xx} & 2G_{xy} & 0 & 0 \\ 0 & 0 & G_{xy} & G_{yy} & G_{xx} & G_{xy} \\ 0 & 0 & 0 & 0 & 2G_{xy} & 2G_{yy} \\ G_{tx} & G_{ty} & 0 & 0 & 0 & 0 \\ G_{txx} & G_{txy} & G_{tx} & G_{ty} & 0 & 0 \\ G_{txy} & G_{tyy} & 0 & 0 & G_{tx} & G_{ty} \\ 0 & 0 & 2G_{txx} & 2G_{txy} & 0 & 0 \\ 0 & 0 & G_{txy} & G_{tyy} & G_{txx} & G_{txy} \\ 0 & 0 & 0 & 0 & 2G_{txy} & 2G_{tyy} \end{bmatrix} \begin{bmatrix} u \\ v \\ u_x \\ v_x \\ u_y \\ v_y \end{bmatrix} \quad (34)$$

Typical assumptions include assumption of translational movement (that is, the assumption that an equation (35) is satisfied) as well as the assumption of the time consistency. In this embodiment, the time consistency is assumed while the translational movement is not assumed. This embodiment is compared to combinations of the cases where these assumptions are assumed or not.

First, this embodiment is compared with the case where not only the time consistency but also the translational movement are assumed. The possibility condition for estimation is relaxed in this embodiment as described in Theorem 1, and the number of states, namely, the number of combinations of the intensity and the optical flow which can be estimated is increased.

Then, this embodiment is compared with the case where the time consistency is not assumed while the translational movement is assumed. This estimation model is suitable to the estimation of the optical flow having a relatively large temporal variation.

Using the intensity, the optical flow, and the spatial gradient of the optical flow at a certain point $P(x_0, y_0)$ on the images, the state q(t) is expressed by an equation (36) and the estimation model of the optical flow is expressed by an equation (37). When the observability is checked as the non-linear system of the estimation model (36) of the optical flow, a necessary and sufficient condition for the observability of the estimation model (37) is given by an equation (38). Because the differentiation is performed twice in order that the differential form becomes the full column rank, the information of the zero, first and second-order differentiation with respect to the time of a measurement variable z(t) is required in order to perform the instantaneous estimation. An equation (39) is obtained when an algebraic equation is obtained in order to perform the estimation similarly to other estimation models described above. The instantaneous estimation can be performed by solving the (over-constraint) linear equation (when the effects of the error and the noise are ignored). Only the optical flow $[u\ v]^T$ can be estimated by solving the first row to third row linear equations, and the information of $[u_t\ v_t]^T$ can be reflected on the estimation of $[u\ v]^T$ by the fourth row constraint equation. On the other hand, the observability condition (38) of this estimation model is more difficult to satisfy than the conventional observability condition. This is because the time invariance is not assumed. Generally the increase of the number of states of the estimation model leads to the degradation of the estimation accuracy and the increasing of the calculation time. Therefore, it should be noted this estimation model is not necessarily more effective than the conventional estimation model.

The invention in which only either of the time invariance and the translational movement is assumed is specified as follows. That is, an object motion estimating device that performs the image analysis of the captured images of an object to estimate the motion of the object, including an image analyzing unit which estimates the information of optical flow by performing the image analysis of at least three captured images in which the object is captured using the information of the second-order differentiation with respect to time. In the case where both the time invariance and the translational movement are assumed, the information of the first-order differentiation is used. And in the case where any of the time invariance and the translational movement is not assumed, the information of the third-order differentiation is used.

In the most general estimation model in which neither the time invariance nor the translational movement is assumed, the estimation model cannot be observed irrespective of the intensity I in the basic state in which the optical flow having the time invariance is simply enlarged or contracted. In other estimation models, the constraint for observability is imposed on the intensity. On the other hand, this estimation model largely differs from other estimation models in that the condition is imposed on the spatiotemporal gradient of the optical flow irrespective of the intensity, which means the optical flow cannot substantially be estimated in this estimation model.

As described above, in the estimation model in which the time invariance is not assumed, the observability condition is difficult to satisfy compared with the estimation model in which the time invariance is assumed, which makes difficult to apply this model to the real image.

[Formula 10]

$$\begin{bmatrix} u_x & u_y \\ v_x & v_y \end{bmatrix} = O \tag{35}$$

$$q(t) = [I\ I_x\ I_y\ I_{xx}\ I_{xy}\ I_{yy}\ I_t\ u\ v\ u_t\ v_t]^T \tag{36}$$

$$\frac{d}{dt}q(t) = f(q(t)) \tag{37a}$$

$$z(t) = h(q(t)) \tag{37b}$$

$$f(q) = \begin{bmatrix} I_t \\ -(I_{xx}u + I_{xy}v) \\ -(I_{xy}u + I_{yy}v) \\ O_{3\times 1} \\ \{(I_{xx}u + I_{xy}v)u + (I_{xy}u + I_{yy}v)v \\ -(I_x u_t + I_y v_t)\} \\ u_t \\ v_t \\ O_{2\times 1} \end{bmatrix} \tag{37c}$$

$$h(q) = [E_{6\times 6}\ O_{6\times 5}]q \tag{37d}$$

$$\text{rank}\begin{bmatrix} I_{xx} & I_{xy} \\ I_{xy} & I_{yy} \end{bmatrix} = 2 \tag{38}$$

$$\begin{bmatrix} I_t \\ I_{tx} \\ I_{ty} \\ I_{tt} \\ I_{ttx} \\ I_{tty} \end{bmatrix} = - \begin{bmatrix} I_x & I_y & 0 & 0 \\ I_{xx} & I_{xy} & 0 & 0 \\ I_{xy} & I_{yy} & 0 & 0 \\ I_{tx} & I_{ty} & I_x & I_y \\ 0 & 0 & I_{xx} & I_{xy} \\ 0 & 0 & I_{xy} & I_{yy} \end{bmatrix} \begin{bmatrix} u \\ v \\ u_t \\ v_t \end{bmatrix} \tag{39}$$

The estimation with the Kalman filter will be described below. In the instantaneous estimation, it is necessary to explicitly calculate the spatiotemporal differential of the intensity, and the difference computing is inevitably performed in order to obtain the information from the image information. Because the difference computing is susceptible to a disturbance, the difference computing has the large effect on the reliability of the estimation of the optical flow.

On the other hand, the Kalman filter sequentially estimates the state of the system from the time-series data of the output of the dynamical system to which the noise is added. In the estimation with the Kalman filter, although temporal resolution is sacrificed, the necessity of the explicit calculation of the temporal differentiation is eliminated, and the necessity of the calculation of the inverse matrix is also eliminated in solving the linear equation of the equation (31), which allows the estimation with high accuracy having the robustness to the disturbance.

A trial to improve the accuracy with the Kalman filter in estimating the optical flow is already performed (see Non Patent Document 7). However, in the technique of Non Patent Document 7, Kalman filter is used only to postulate the smoothness in the temporal direction with respect to the estimate value of the optical flow obtained based on the instantaneous method. Therefore, the technique of Non Patent Document 7 is substantially identical to the instantaneous estimating method in terms of solving the linear equation of the equation (31).

Therefore, the method for applying the Kalman filter to the proposed estimation model (11) to estimate the optical flow will be described.

First, the estimation model in which the spatial gradient is not used will be described. One of the features of the Kalman filter is that the necessity of the temporal differentiation is eliminated. On the other hand, the measurement amount of the proposed estimation model includes the spatial differentiation component of the intensity. If the estimation models are directly used, it is inevitably necessary to calculate the spatial differentiation.

Therefore, an estimation model is proposed in the following in which the measurement equation of the estimation model is modified to eliminate the necessity of the calculation of the spatial differentiation in the sequential estimation with Kalman filter. Specifically, the intensity I in the spatial neighborhood of the particular point $P(x_0,y_0)$ is used as the measurement variable instead of the spatial gradient at the particular point $P(x_0,y_0)$, and the intensity in the neighborhood of 3×3 of the particular point $P(x_0,y_0)$, expressed by an equation (40), is considered as the new measurement variable z(t).

Because the intensity $I(x0+\Delta x, y0+\Delta y)$ ($\Delta x, \Delta y > 0$) at the neighborhood point is approximated by an equation (41), the new measurement variable z(t) can be approximated by an equation (42). Here, n is the number of order (or the number of elements) of the state q. At this point, the rank of the matrix H of the equation (42b) is always 6, and z(t) can be restored from z(t) by an equation (43). This shows that the observability of the system is maintained. Therefore, the Kalman filter can be constructed by replacing the spatial gradient with the intensity information on the neighborhood point as the measurement variable.

In the above, the neighborhood of 3×3 is considered for the sake of simplicity. However, H of the equation (42b) can be easily calculated also for a general neighborhood of k×l (at least 3×3) or for a neighborhood other than the rectangle one, and the Kalman filter can be constructed in the case where the rank of H is 6.

[Formula 11]

$$\tilde{z}(t) = \begin{bmatrix} I(x_0 - \Delta x, y_0 - \Delta y, t) \\ I(x_0 - \Delta x, y_0, t) \\ I(x_0 - \Delta x, y_0 + \Delta y, t) \\ I(x_0, y_0 - \Delta y, t) \\ I(x_0, y_0, t) \\ I(x_0, y_0 + \Delta y, t) \\ I(x_0 + \Delta x, y_0 - \Delta y, t) \\ I(x_0 + \Delta x, y_0, t) \\ I(x_0 + \Delta x, y_0 + \Delta y, t) \end{bmatrix} \quad (40)$$

$$I = I + I_x \Delta x + I_y \Delta y + \frac{1}{2} I_{xx} \Delta x^2 + I_{xy} \Delta x \Delta y + \frac{1}{2} I_{yy} \Delta y^2 \quad (41)$$

$$\tilde{z} = \tilde{H} q(t) \quad (42a)$$

$$\tilde{H} = \begin{bmatrix} 1 & -\Delta x & -\Delta y & \frac{\Delta x^2}{2} & \Delta x \Delta y & \frac{\Delta y^2}{2} \\ 1 & -\Delta x & 0 & \frac{\Delta x^2}{2} & 0 & 0 \\ 1 & -\Delta x & \Delta y & \frac{\Delta x^2}{2} & -\Delta x \Delta y & \frac{\Delta y^2}{2} \\ 1 & 0 & -\Delta y & 0 & 0 & \frac{\Delta y^2}{2} \\ 1 & 0 & 0 & 0 & 0 & 0 & O_{9\times(n-6)} \\ 1 & 0 & \Delta y & 0 & 0 & \frac{\Delta y^2}{2} \\ 1 & \Delta x & -\Delta y & \frac{\Delta x^2}{2} & -\Delta x \Delta y & \frac{\Delta y^2}{2} \\ 1 & \Delta x & 0 & \frac{\Delta x^2}{2} & 0 & 0 \\ 1 & \Delta x & \Delta y & \frac{\Delta x^2}{2} & \Delta x \Delta y & \frac{\Delta y^2}{2} \end{bmatrix} \quad (42b)$$

$$z(t) = \frac{1}{36} \text{diag}\left\{1, \frac{1}{\Delta x}, \frac{1}{\Delta y}, \frac{1}{\Delta x^2}, \frac{1}{\Delta x \Delta y}, \frac{1}{\Delta y^2}\right\} \quad (43)$$

$$\begin{bmatrix} -4 & 8 & -4 & 8 & 20 & 8 & -4 & 8 & -4 \\ -6 & -6 & -6 & 0 & 0 & 0 & 6 & 6 & 6 \\ -6 & 0 & 6 & -6 & 0 & 6 & -6 & 0 & 6 \\ 12 & 12 & 12 & -24 & -24 & -24 & 12 & 12 & 12 \\ 9 & 0 & -9 & 0 & 0 & 0 & -9 & 0 & 9 \\ 12 & -24 & 12 & 12 & -24 & 12 & 12 & -24 & 12 \end{bmatrix} \tilde{z}(t)$$

The estimation processing performed by the state estimating unit 27 of the image analyzing unit 13 of FIG. 1 using the Kalman filter will be described below. A model of an equation (44) to which the noise is added is considered. Here, it is assumed that f(q) and H are given by the equations (11c) and (42b), respectively, and it is assumed that a system noise u(t) and a measurement noise w(t) are Gaussian noises having covariance matrices Q and R, respectively. In this configuration, the optical flow can be estimated when the sequential estimation is performed using the Kalman filter.

The estimation model of the optical flow is the non-linear system having the strong non-linearity. Therefore, it is proposed that the optical flow is estimated by performing the state estimation using not an extended Kalman filter which linearly approximates the non-linearity but an unscented Kalman filter which approximates the covariance of the estimate value (see Non Patent Document 2). The unscented Kalman filter has the feature that the estimation accuracy can be improved by performing the estimation in which the system disturbance is included in the state see Non Patent Document 6) and the feature that the estimation accuracy can be improved also by using a high-order integration formula such as a Runge-Kutta method in discretization in the temporal direction. There is a trade-off relationship between the improvement of the estimation accuracy and the time necessary to calculate the estimation. A model in which the system disturbance is included in the state should be adopted and at least a second-order numerical integration formula should be used in consideration of the non-linearity.

[Formula 12]

$$\frac{d}{dt} q(t) = f(q(t)) + u(t) \quad (44a)$$

$$\tilde{z}(t) = \tilde{H} q(t) + w(t) \quad (44b)$$

As described above, in this embodiment, the possibility of estimating the optical flow only from the assumption of the intensity constancy and the local intensity information is demonstrated from the standpoint of the observability of the dynamical system. The constraint equation of intensity constancy is extended in order to relax the assumption of the translational movement with respect to the optical flow. The derived constraint equation is the condition in order that the coefficient of each term of the Taylor expansion of the conditional expression for the intensity constancy in the neighborhood of the particular point on the images becomes 0. Therefore, it is found that the conventional constraint equation of intensity constancy corresponds to the term of zero order of the Taylor expansion.

Further, in this embodiment, the estimation model as a dynamical system is proposed from not only the standpoint of relaxing the assumption of the translational movement with respect to the optical flow but also the standpoint of simultaneously estimating the optical flow and the spatial gradient of the optical flow. And the possibility of estimation is discussed from the standpoint of the observability of the dynamical system, and it is shown that sometimes the optical flow and the spatial gradient of the optical flow can be estimated even if the Hessian matrix of the intensity is the zero matrix.

Additionally, the numerically robust estimating method with the Kalman filter is proposed by modifying the output equation of the estimation model where the calculation of the inverse matrix of the Hessian matrix or the like and the explicit calculation of the spatiotemporal gradient are removed.

The Kalman filter is described above as an example. Alternatively, another sequential estimation technique may be used.

For example, the estimation model may be derived based on the conditional expression in which the Taylor expansion to the term of higher order is used, or the estimation model may deal with the time variance of the optical flow.

[Second Embodiment]

In the second embodiment, effectiveness of the proposed estimation model will be demonstrated by a specific example.

The intensity I(x,y,t) of original images is given by an equation (45). The original images are obtained by rotating the image in which the spatial gradient of the intensity is flat (Hessian matrix is the zero matrix) about a point (0,0) at a constant angular velocity $\omega(\neq 0)$. The optical flow and the spatial gradient of the optical flow in the coordinate (x,y) of the original images are uniquely determined on the assumption of the time invariance and expressed by an equation (46). On the other hand, the spatiotemporal gradient of the intensity is expressed by an equation (47), and the Hessian matrix of the intensity becomes the zero matrix. Therefore, the optical flow cannot be estimated by the conventional local estimating method.

[Formula 13]

$$I(x, y, t) = \beta(x\cos\omega t + y\sin\omega t) + I_0 \quad (45)$$

$$\begin{bmatrix} u(x, y, t) \\ v(x, y, t) \end{bmatrix} = \begin{bmatrix} -y\omega \\ x\omega \end{bmatrix} \quad (46a)$$

$$\begin{bmatrix} u_x(x, y, t) & u_y(x, y, t) \\ v_x(x, y, t) & v_y(x, y, t) \end{bmatrix} = \begin{bmatrix} 0 & -\omega \\ \omega & 0 \end{bmatrix} \quad (46b)$$

$$I_t(x, y, t) = \beta\omega(-x\sin\omega t + y\cos\omega t) \quad (47a)$$

$$\begin{bmatrix} I_x(x, y, t) \\ I_y(x, y, t) \end{bmatrix} = \begin{bmatrix} \beta\cos\omega t \\ \beta\sin\omega t \end{bmatrix} \quad (47b)$$

$$\begin{bmatrix} I_{xx}(x, y, t) & I_{xy}(x, y, t) \\ I_{xy}(x, y, t) & I_{yy}(x, y, t) \end{bmatrix} = \begin{bmatrix} 0 & 0 \\ 0 & 0 \end{bmatrix} \quad (47c)$$

A theoretical calculation will be described below. Whether the optical flow can theoretically be calculated from the intensity of the original images of the equation (45) and the spatial gradient of the intensity is discussed.

First, a global method proposed by Horn, et al. (1981) is applied. In the global method proposed by Horn, et al. (1981), an expression (48) is minimized for a certain region D. Where $\gamma > 0$ is a parameter used to adjust strength of the smoothing. The region $D = \{(x,y) | -a \leq x \leq a, -b \leq y \leq b\} (a,b>0)$ and without loss of generality the time t=0 are considered. The estimation function becomes an expression (49) at t=0 by equations (47a) and (47b), and a solution $v_x = v_y = 0$, namely, v=const. is obtained for any u or $\gamma$. This means that v(x, y, 0) cannot uniquely be determined and that, even if v(x, y, 0) is determined, v(x, y, 0) differs from a true value (46). For u(x, y, 0), when the region D has the rectangular shape like the present assumption, u that minimizes an expression (50) at $u_x = 0$ may be selected. An equation (51) is obtained as the minimum solution when the expression (50) is solved by a variation method. Although u(x, y, 0) is matched with the true value in the case of a weight $\gamma$ of the smoothness $\gamma \to 0$, u(x, y, 0) is not matched with the true value as long as $\gamma > 0$. As described above, in this numerical example, it is found that the optical flow is not uniquely determined even if the global method of Horn, et al. (1981) is used, and that, even if the optical flow is determined, the optical flow is not matched with the true value.

On the other hand, the instantaneous estimation equation (31) of the proposed estimation model is expressed by an equation (52) in consideration of the equation (47c). At this point, trivial equation in which both sides become 0 is removed and the order of the equations is rearranged. The equation (52) is three sets of two-dimensional linear simultaneous algebraic equations, and becomes equivalent to the three equations (53a), (53b), and (53c) by substituting the equations (47a) and (47b) into the equation (52). In each of the equations (53a), (53b), and (53c), the solution is uniquely determined irrespective of t, and the solution is matched with the theoretical value of the equation (46). This fact shows that the proposed estimation model has superiority to the global method.

The numerical calculation will be described below. Here, parameters of the original images of the equation (45) are set in $\beta = 0.2$, $\omega = \pi/100$, $I_0 = 128$, and the effectiveness of the proposed technique is demonstrated by applying the proposed technique to the measured images in which the space-time and the intensity are quantized.

Specifically, dealing with the original images given by the equation (45) as the captured images, the quantizing unit 7 of FIG. 1 quantizes the captured image by rounding down to integer numbers at a point (x,y) in which (x,y) are integers at an integral time t, thereby producing the measured images. The smoothing unit 11 of FIG. 1 performs the smoothing at each time of the measured images using a Gaussian filter of $\sigma = 3$. The image analyzing unit 15 estimates the optical flow using the intensity information on the smoothed images.

Figure 3:
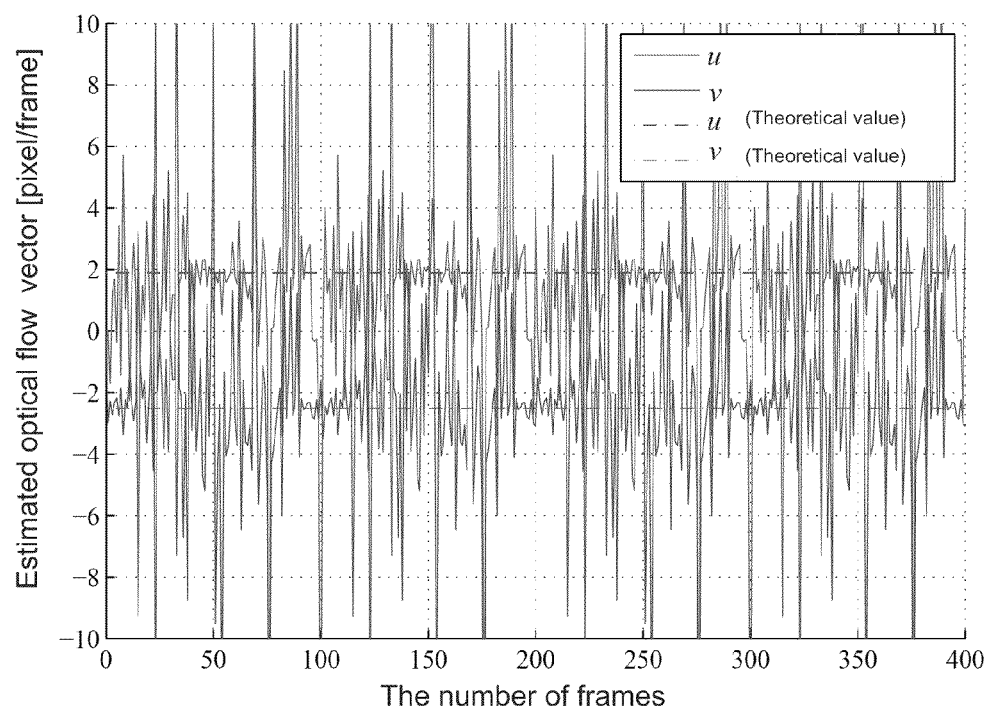
FIG. 3 is a view illustrating a result of instantaneous estimation in a second embodiment.

First, the result of the instantaneous estimation performed by the proposed estimation model is shown in the following. FIG. 3 illustrates 400 frames (two rotations) of the estimate value of the optical flow $[u\ v]^T$ in the coordinate (60,80). The estimation is not performed well because the large error is added to the estimate value by the effect of the quantizing error. This is attributed to the fact that, because the original images are smooth and textureless images, even the level of the quantizing error has the large effect on the calculation of the inverse matrix.

Next, the result of the estimation in which the Kalman filter is used in order to deal with the quantizing error is illustrated. A model in which the equation (11) of the proposed estimation model is corrected by the output equation of the equation (42) is used in the estimation. The equation (44) in which the noise is added to the model is considered to perform the estimation with the unscented Kalman filter. Here, the covariance matrices of the noise in the equation (44) is expressed by equations (54) and (55), and all the initial values of the estimate values of the states used in the Kalman filter are set to 0. A classical four-order Runge-Kutta formula is used in the numerical integration of the optical flow model, and an experiment is performed using an estimation model (see Non Patent Document 6) that is extended to include the system noise in the state as the model of the unscented Kalman filter.

Figure 4:
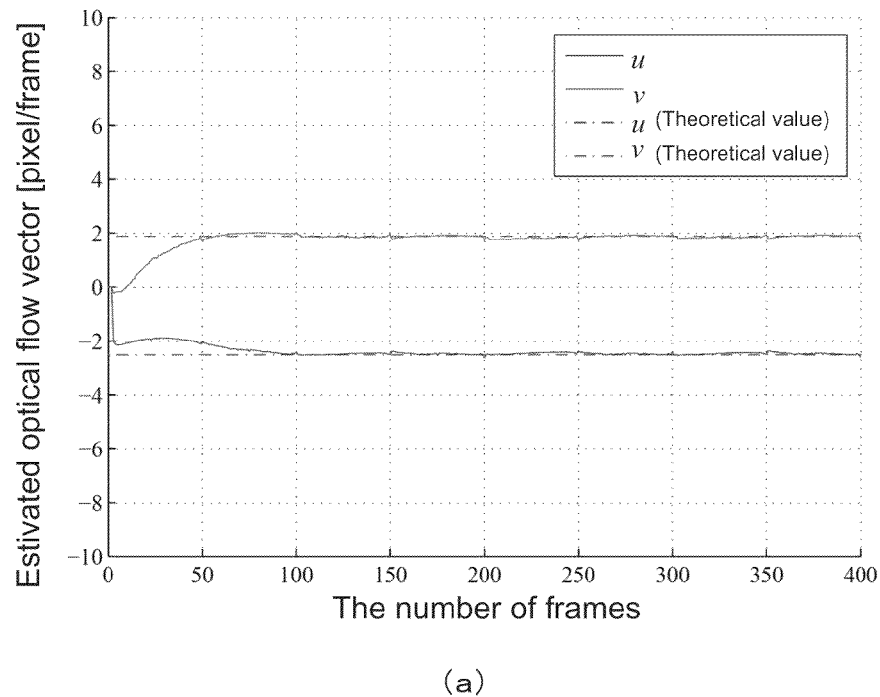
FIG. 4 is a view illustrating a result of estimation with a Kalman filter in the second embodiment.
Figure 4:
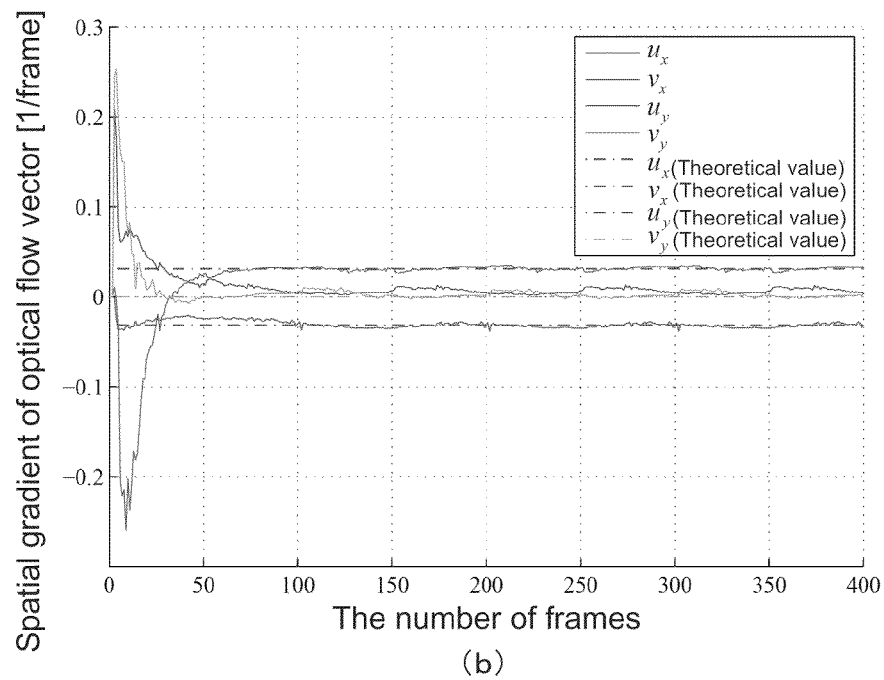

FIG. 4 illustrates 400 frames (two rotations) of the estimate value of the optical flow $[u\ v]^T$ in the coordinate (60,80) and its spatial gradient $u_x$, $u_y$, $v_x$, $v_y$. As can be seen from FIG. 4, although it takes a long time until convergence because the initial value is largely deviated, the estimation can accurately be performed. It is also demonstrated that the spatial gradient of the optical flow can simultaneously be estimated. Therefore, the effectiveness of the estimating method in which the proposed estimation model and the Kalman filter are used are demonstrated.

[Formula 14]

$$\int\int_D \{\gamma^2(u_x^2 + u_y^2 + v_x^2 + v_y^2) + (I_x u + I_y v + I_t)^2\} dx dy \quad (48)$$

-continued $$\iint_D \{\gamma^2(u_x^2 + u_y^2 + v_x^2 + v_y^2) + \beta^2(u + y\omega)^2\}dxdy \quad (49)$$

$$\int_{-a}^{a} \{\gamma^2 u_y^2 + \beta^2(u + y\omega)^2\}dy \quad (50)$$

$$u(x, y, 0) = -\omega y + \frac{\gamma\omega}{\beta\cosh\frac{\beta a}{\gamma}}\sinh\frac{\beta y}{\gamma} \quad (51)$$

$$\begin{bmatrix} I_t \\ I_{tt} \\ I_{tx} \\ I_{ttx} \\ I_{ty} \\ I_{tty} \end{bmatrix} = -\begin{bmatrix} I_x & I_y & 0 & 0 & 0 & 0 \\ I_{tx} & I_{ty} & 0 & 0 & 0 & 0 \\ 0 & 0 & I_x & I_y & 0 & 0 \\ 0 & 0 & I_{tx} & I_{ty} & 0 & 0 \\ 0 & 0 & 0 & 0 & I_x & I_y \\ 0 & 0 & 0 & 0 & I_{tx} & I_{ty} \end{bmatrix}\begin{bmatrix} u \\ v \\ u_x \\ v_x \\ u_y \\ v_y \end{bmatrix} \quad (52)$$

$$\begin{bmatrix} \beta\omega(-x\sin\omega t + y\cos\omega t) \\ \beta\omega^2(-x\cos\omega t - y\sin\omega t) \end{bmatrix} = -\begin{bmatrix} \beta\cos\omega t & \beta\sin\omega t \\ -\beta\omega\sin\omega t & \beta\omega\cos\omega t \end{bmatrix}\begin{bmatrix} u \\ v \end{bmatrix} \quad (53a)$$

$$\begin{bmatrix} -\beta\omega\sin\omega t \\ -\beta\omega^2\cos\omega t \end{bmatrix} = -\begin{bmatrix} \beta\cos\omega t & \beta\sin\omega t \\ -\beta\omega\sin\omega t & \beta\omega\cos\omega t \end{bmatrix}\begin{bmatrix} u_x \\ v_x \end{bmatrix} \quad (53b)$$

$$\begin{bmatrix} \beta\omega\cos\omega t \\ -\beta\omega^2\sin\omega t \end{bmatrix} = -\begin{bmatrix} \beta\cos\omega t & \beta\sin\omega t \\ -\beta\omega\sin\omega t & \beta\omega\cos\omega t \end{bmatrix}\begin{bmatrix} u_y \\ v_y \end{bmatrix} \quad (53c)$$

$$Q = \text{diag}\{10^{-1}, 10^{-3}, 10^{-3}, 10^{-5}, \\ 10^{-5}, 10^{-5}, 10^{-1}, 10^{-1}, 10^{-3}, 10^{-3}, 10^{-3}, 10^{-3}\} \quad (54)$$

$$R = 10^{-3}E_{9\times 9} \quad (55)$$

INDUSTRIAL APPLICABILITY

The optical flow is a highly-versatile technology that can be used to measure the motion of the object in the image. Specifically, for example, motion of a mobile object is measured with a car-mounted camera of an automobile. Because the car-mounted camera is basically oriented toward the travelling direction, the motion along the optical axis is inevitable. Bedides, the expansion caused by the distortion of the image is inevitable in the wide-angle image such as the drive recorder. According to the present invention, the optical flow can be calculated with high accuracy even in such cases. Additionally, the mobile object can generally be detected. For example, warning of running into the street or passing vehicle can be realized with the car-mounted camera, detection of an intruder in a building, and correction of the coordinate of the moving camera can also be performed.

A rotating velocity of an already-assembled rotary machine can be measured without placing something on a rotating shaft. The conventional angular velocity sensor is mainly attached to the rotating shaft. According to the present invention, the angular velocity and a distance to the rotation center can be measured from time-series images of rotating body that does not necessarily include the rotation center.

Additionally, the present invention is also useful to fluid measurement (particularly, a vortex and turbulence) in which the translational movement of the object cannot be assumed.

REFERENCE SIGNS LIST

Figure 2:
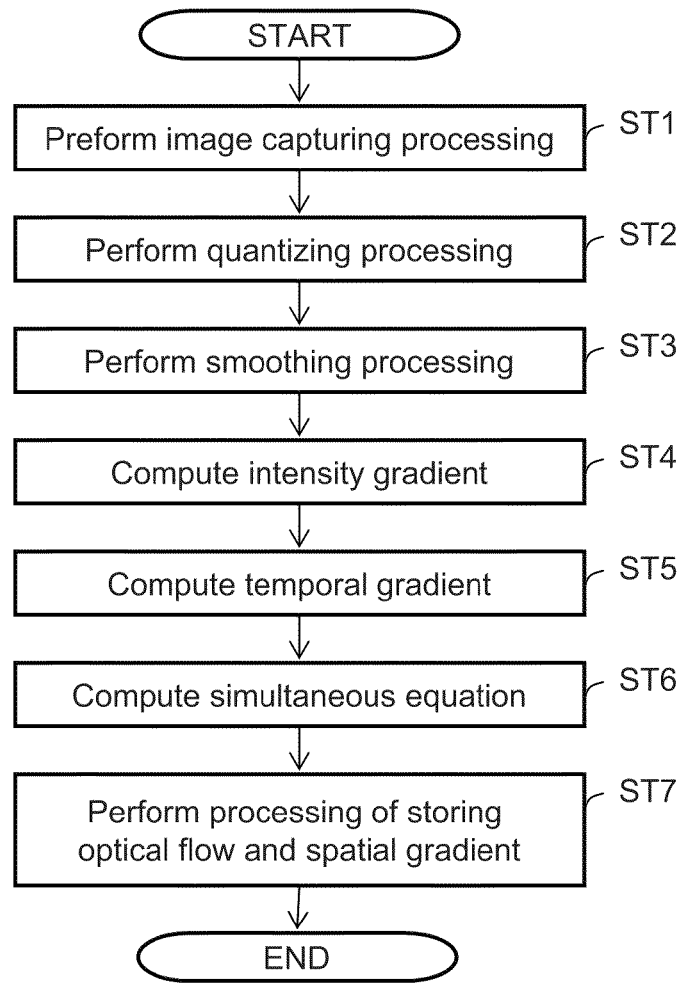
FIG. 2 is a view illustrating an example of a flow of image processing performed by the object motion estimating device 1 of FIG. 1.

1 Object motion estimating device
13 Image analyzing unit
21 Intensity gradient computing unit
23 Temporal gradient computing unit
25 Equation computing unit
27 State estimating unit
FIG. 1
1 Object motion estimating device
3 Image capturing unit
5 Captured image storage unit
7 Quantizing unit
9 Measured image storage unit
9 Smoothing unit
11 Smoothed image storage unit
13 image analyzing unit
21 Intensity gradient computing unit
23 Temporal gradient computing unit
25 Equation computing unit
27 State estimating unit
15 Optical flow storage unit
FIG. 2
1 START
ST1 Perform image capturing processing
ST2 Perform quantizing processing
ST3 Perform smoothing processing
ST4 Compute intensity gradient
ST5 Compute temporal gradient
ST6 Compute simultaneous equation
ST7 Perform processing of storing optical flow and spatial gradient
2 END
FIG. 3
1 Estimated optical flow vector [pixel/frame]
2 Theoretical value
3 The number of frames
FIG. 4
1 Estimated optical flow vector [pixel/frame]
2 Theoretical value
3 The number of frames
4 Spatial gradient of optical flow vector [1/frame]

The invention claimed is:

1. An object motion estimating device that performs image analysis of captured images to estimate motion of an object, the captured images being the images of the object captured by an image capturing unit,
the object motion estimating device comprising an image analyzing unit, the image analyzing unit including a state estimating unit that performs sequential estimation of a state variable in an estimation model or an equation computing unit that solves simultaneous equations, and
the image analyzing unit comprises:
an intensity gradient computing unit that computes an intensity gradient at a particular point of the captured images; and
a temporal gradient computing unit that computes a temporal gradient from the intensity gradient,
wherein, in the estimation model, the state variable includes not only an optical flow by assuming that a time invariance that a first-order total differential of intensity of the object in the captured images with respect to time is zero holds as for the optical flow that is a velocity distribution of relative motion between the image capturing unit and the object, but also a spatial gradient of the optical flow by not assuming that translational movement that the object moves on a plane perpendicular to an image capturing axis of the image capturing unit holds,
wherein the estimation model includes a measurement equation in which intensity of the spatial neighborhood of a particular point on the captured images is set to a measurement variable, wherein the state estimating unit performs the sequential estimation of the state variable to simultaneously estimate the optical flow and a spatial gradient of the estimated optical flow, wherein the simultaneous equations comprise:

the estimation model and a temporal differentiation of the intensity included in the estimation model, and the optical flow, wherein a spatial gradient of the optical flow is set to a variable, and a temporal differentiation of the intensity and intensity gradient and second-order differential coefficients of the intensity and of the intensity gradient with respect to time are set to coefficients, wherein the equation computing unit solves the simultaneous equations to simultaneously estimate the optical flow and a spatial gradient of the estimated optical flow, and wherein the captured images are two-dimensional images having size of at least 3 pixels by 3 pixels, at least the three captured images whose image capturing times differ from one another are stored in a captured image storage unit, the intensity gradient computing unit computes intensity gradients $I_x(x_0,y_0,t)$, $I_y(x_0,y_0,t)$, $I_{xx}(x_0,y_0,t)$, $I_{xy}(x_0,y_0,t)$, and $I_{yy}(x_0,y_0,t)$ of intensity $I$ at a particular point $P(x_0,y_0)$ of the captured images to determine a measurement variable $z(t)$ expressed by an equation (eq1), the temporal gradient computing unit computes temporal gradients $I_t$, $I_{tx}$, $I_{ty}$, $I_{txx}$, $I_{txy}$, $I_{tyy}$, $I_{tt}$, $I_{ttx}$, $I_{tty}$, $I_{ttxx}$, $I_{ttxy}$, and $I_{ttyy}$ from the intensity $I$ and the intensity gradients $I_x$, $I_y$, $I_{xx}$, $I_{xy}$, and $I_{yy}$, and the equation computing unit solves a linear equation (eq2) to simultaneously estimate the optical flow $[u\ v]^T$ and a spatial gradient $[u_x\ v_x\ u_y\ v_y]^T$ of the optical flow $[u\ v]^T$:

[Formula 1]

$$z(t) = \begin{bmatrix} I(x_0, y_0, t) \\ I_x(x_0, y_0, t) \\ I_y(x_0, y_0, t) \\ I_{xx}(x_0, y_0, t) \\ I_{xy}(x_0, y_0, t) \\ I_{yy}(x_0, y_0, t) \end{bmatrix} \quad (\text{eq 1})$$

$$\begin{bmatrix} I_t \\ I_{tx} \\ I_{ty} \\ I_{txx} \\ I_{txy} \\ I_{tyy} \\ I_{tt} \\ I_{ttx} \\ I_{tty} \\ I_{ttxx} \\ I_{ttxy} \\ I_{ttyy} \end{bmatrix} = - \begin{bmatrix} I_x & I_y & 0 & 0 & 0 & 0 \\ I_{xx} & I_{xy} & I_x & I_y & 0 & 0 \\ I_{xy} & I_{yy} & 0 & 0 & I_x & I_y \\ 0 & 0 & 2I_{xx} & 2I_{xy} & 0 & 0 \\ 0 & 0 & I_{xy} & I_{yy} & I_{xx} & I_{xy} \\ 0 & 0 & 0 & 0 & 2I_{xy} & 2I_{yy} \\ I_{tx} & I_{ty} & 0 & 0 & 0 & 0 \\ I_{txx} & I_{txy} & I_{tx} & I_{ty} & 0 & 0 \\ I_{txy} & I_{tyy} & 0 & 0 & I_{tx} & I_{ty} \\ 0 & 0 & 2I_{txx} & 2I_{txy} & 0 & 0 \\ 0 & 0 & I_{txy} & I_{tyy} & I_{txx} & I_{txy} \\ 0 & 0 & 0 & 0 & 2I_{txy} & 2I_{tyy} \end{bmatrix} \begin{bmatrix} u \\ v \\ u_x \\ v_x \\ u_y \\ v_y \end{bmatrix} . \quad (\text{eq 2})$$

2. The object motion estimating device according to claim 1 wherein a system noise and a measurement noise are considered in the measurement equation, and the sequential estimation of the state variable is performed using a Kalman filter that approximates a covariance of an estimated value.

* * * * *